United States Patent [19]
Dorren

[11] 3,943,294

[45] Mar. 9, 1976

[54] MULTI-MONO FM SYSTEM

[75] Inventor: Louis Dorren, San Mateo, Calif.

[73] Assignee: Quadracast Systems, Inc., San Mateo, Calif.

[22] Filed: June 21, 1974

[21] Appl. No.: 481,787

[52] U.S. Cl. .......... 179/15 BT
[51] Int. Cl.[2] .......... H04H 5/00; H04J 1/00
[58] Field of Search .......... 179/15 BT

[56] References Cited

UNITED STATES PATENTS

| | | | |
|---|---|---|---|
| 3,534,172 | 10/1970 | Weeda | 179/15 BT |
| 3,708,623 | 1/1973 | Dorren | 179/15 BT |
| 3,792,199 | 2/1974 | Saeki | 179/15 BT |

*Primary Examiner*—Kathleen H. Claffy
*Assistant Examiner*—George G. Stellar
*Attorney, Agent, or Firm*—Robert G. Slick

[57] ABSTRACT

A multi-mono FM transmission and reception system is provided whereby during a portion of the programming a four-channel music system can be broadcast and received and during another portion of the programming four discrete languages can be broadcast and separately received. An automatic switching system is provided so that with the proper equipment, one receives a four-channel music program during a musical transmission and a single selected voice channel during voice transmissions. Provision is made so that the main language of the country will be received on a mono receiver.

4 Claims, 12 Drawing Figures

MULTI-MONO FM SYSTEM

SUMMARY OF THE INVENTION

In the inventor's previous U.S. Pat. No. 3,798,623, a four-channel FM system is described and claimed which is compatible with normal mono and stereo FM receivers. Thus, if one has only a mono receiver, all four channels are combined or if one has a stereo receiver, the right and left hand signals are received while if one has a four-channel receiver, one receives the four signals separated.

The four channels which are ordinarily transmitted would be left front, left back, right front and right back, but since these signals might be transmitted in any order, they can be referred to merely as A, B, C and D. Since here we are dealing with two sets of four signals each, we have further broken down the signals into four music signals designated AM, BM, CM and DM and into four voice or language signals designated AV, BV, CV and DV.

In many parts of the world there are areas wherein more than one language is used so that it is desirable to provide a transmission system wherein more than one language can be broadcast at a time. Although the system disclosed in U.S. Pat. No. 3,708,623 is capable of broadcasting four completely independent signals, it would not ordinarily be desirable to broadcast four separate languages in such a system unless everyone in a given area had a four-channel FM receiver and would select one of the languages. In this system, the base band contains all four signals so that if a musical program is being broadcast, and one has only a mono receiver, all four of the signals would be blended together. If one had a mono receiver and four separate languages were being broadcast, the base band would contain a hopeless jumble of the four languages, none of which would be understandable.

In accordance with the present invention, a system is provided wherein a four-channel system can be used in the normal manner when music or similar program material is being broadcast but wherein during a voice program, each of the channels would contain a separate language including the base band. Thus, one having a mono receiver would receive the combined four signals during music broadcast and during a voice broadcast would receive only a single language. It is obvious that the main language of a country would normally be put on the base band and that less frequently used languages would be placed on the other bands.

In accordance with the present invention, a unique switching system is provided whereby it is not necessary for the listener to do any manipulating, other than initially selecting a language, to go between one and four channel transmissions. Thus, the owner of a mono receiver will receive all four of the music channels and the most important of the languages transmitted while the owner of a four-channel receiver can select one of the desired voice channels and then during music transmissions will receive the four separated music signals while during voice transmissions all four channels of the receiver will carry a selected one of the languages being transmitted.

With an ordinary stereo receiver, one can receive only the base band voice signals during language transmissions by switching his receiver to mono-aural or left plus right. Some stereo receivers have an L minus R switch position and this would allow the listener to listen to the language on the 38 kHz sine channel.

BRIEF DESCRIPTION OF THE DRAWINGS

In the drawings forming part of this patent application.

DESCRIPTION OF THE PREFERRED EMBODIMENTS

Figure 12:
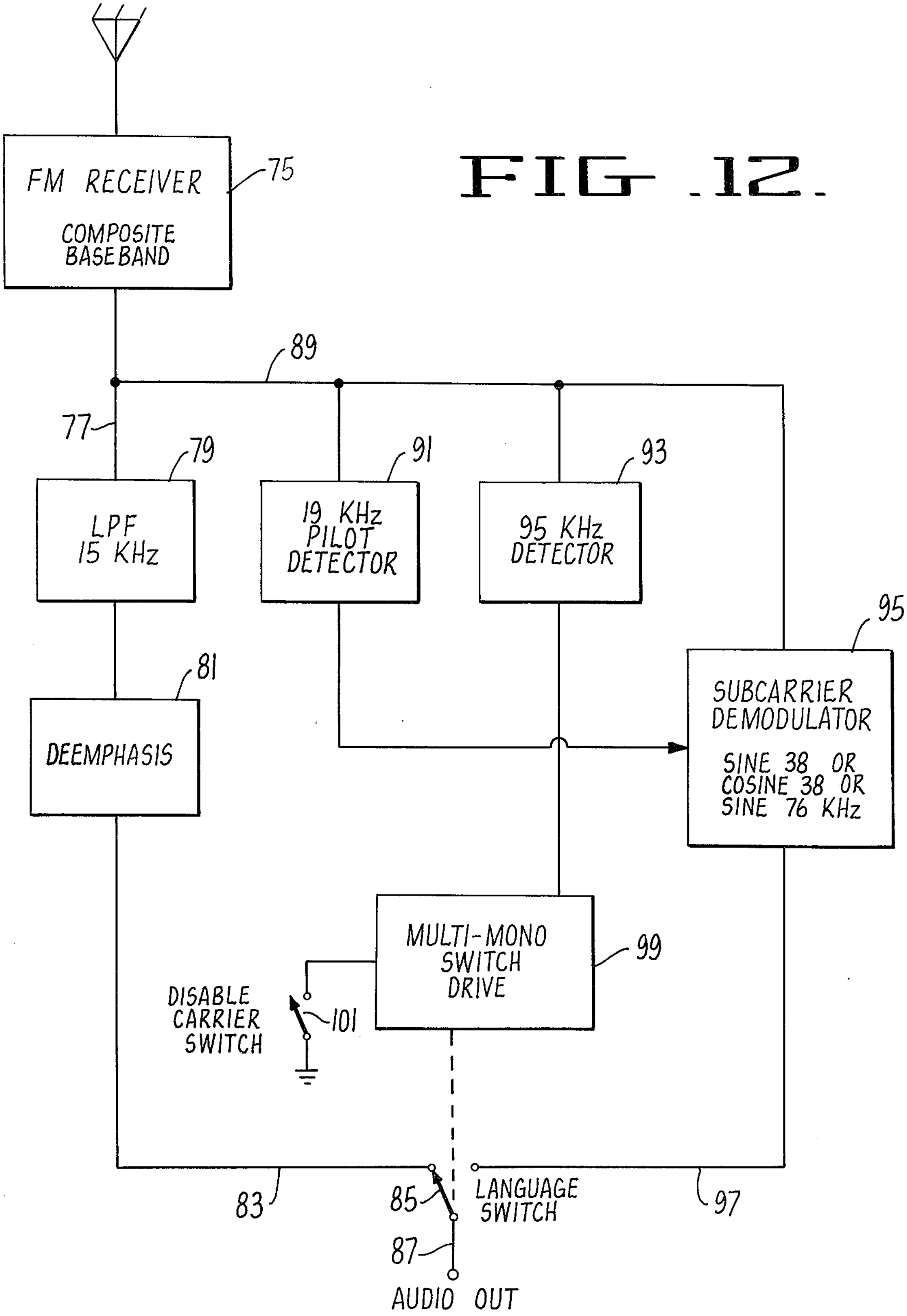
FIG. 12 is a schematic diagram showing an inexpensive receiver which can be used to receive a selected one of the subcarrier channels.

In a conventional four-channel FM system there are four music channels which are encoded through the use of a quadraplex generator on a transmitted signal. Such a generator having four audio inputs is shown in FIG. 12 of U.S. Pat. No. 3,708,623. In accordance with the present invention, in addition to having the four music channels, one also has four voice channels. As was previously mentioned, the voice channels have been designated AV, BV, CV and DV while the music channels have been designated AM, BM, CM and DM. In this description it is assumed that one has voice and music channels although the eight channels might be divided in some other manner for specialized purposes. For instance, the four voice channels might actually be music with the lyrics sung in different languages.

Figure 11:
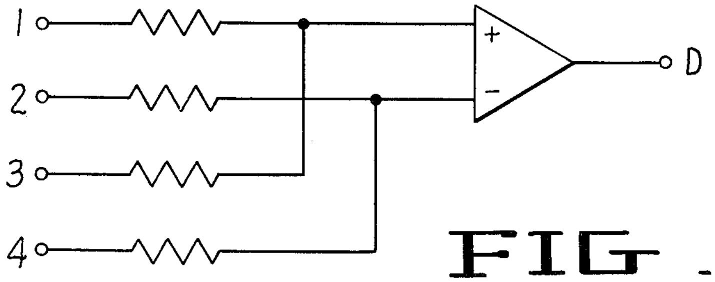

As is brought out in U.S. Pat. No. 3,708,623, the music channels are passed through a quadraplex generator and are typically transmitted as a base band signal occupying the space from 50 to 15 kHz containing the information AM + BM + CM + DM, as a sine signal centered on 38 kHz containing the information AM + BM − CM − DM, a cosine signal centered on 38 kHz containing the information AM − BM − CM + DM and a fourth signal centered on 76 kHz containing the information AM − BM + CM − DM. Of course, there is the usual 19 kHz pilot which is doubled to provide the carrier for the 38 kHz signal and again doubled to provide the 76 kHz carrier. A typical frequency allocation is shown in FIG. 11 of U.S. Pat. No. 3,708,623.

Figure 1:
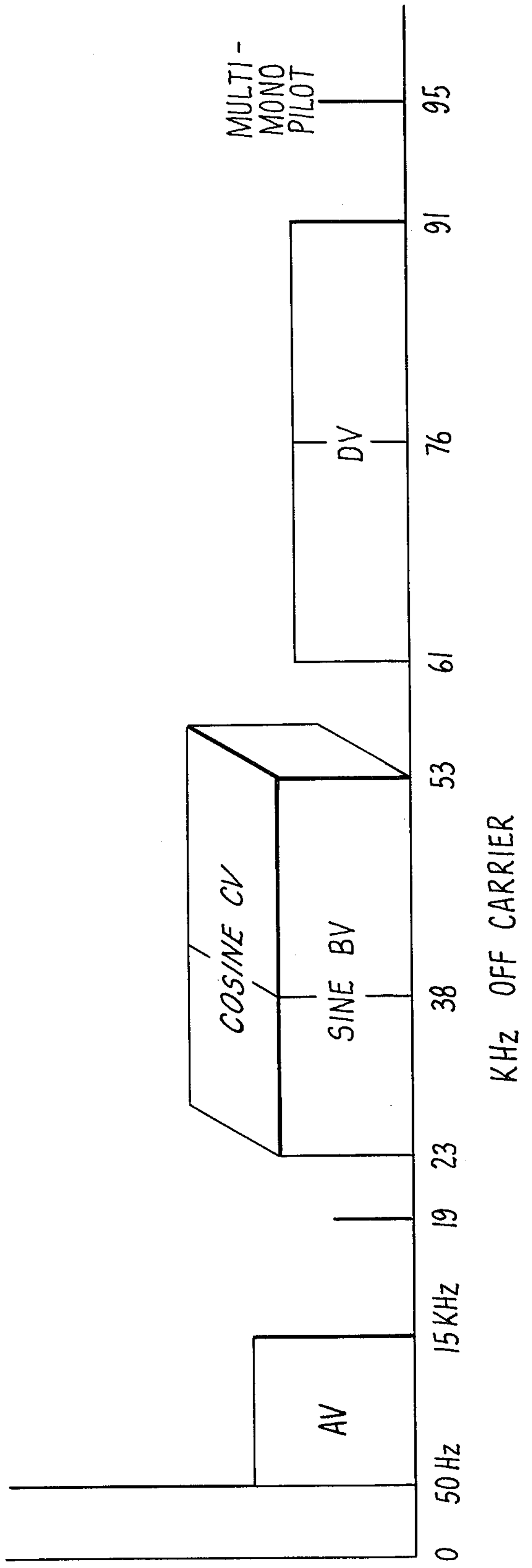
FIG. 1 is a spectrum diagram of a four-channel signal showing the space occupied by each of the signals when four separate languages are being transmitted.

With the system of the present invention, the quadraplex generator is connected to the four input channels during music transmissions but during voice transmissions the voice signals are matrixed in such a manner that each signal is individually transmitted rather than being transmitted as a mono and stereo compatible composite. Thus, referring to FIG. 1, the first signal AV is assigned to the space in the base band of 50 to 15 kHz. The signal BV is assigned as the sine of the signal centered at 38 kHz while the signal CV is assigned the cosine space at 38 kHz. The signal DV is assigned the space centered at 76 kHz. In addition to the 19 kHz pilot which serves as a switching signal, it is necessary that a second pilot be provided to serve as a switching signal between the normal quadraplex mode and the multi-mono mode. This second pilot can be located at any convenient point on the spectrum and is preferably, although not necessarily, a multiple of the usual 19 kHz pilot. Thus, it might be at 57 kHz or, as is shown in FIG. 1, at 95 kHz. Preferably, the second or multi-mono pilot is centered on 95 kHz to minimize the possibility of interference and the 19 and 95 kHz pilots are phase locked together. The second pilot can be used in either positive or negative sense, i.e. the pilot can be used to switch to the multi-mono mode when the pilot is on or vice versa. For the purpose of this specification, it will be assumed that when the multi-mono pilot is on, the transmission is in the multi-mono mode.

Figure 2:
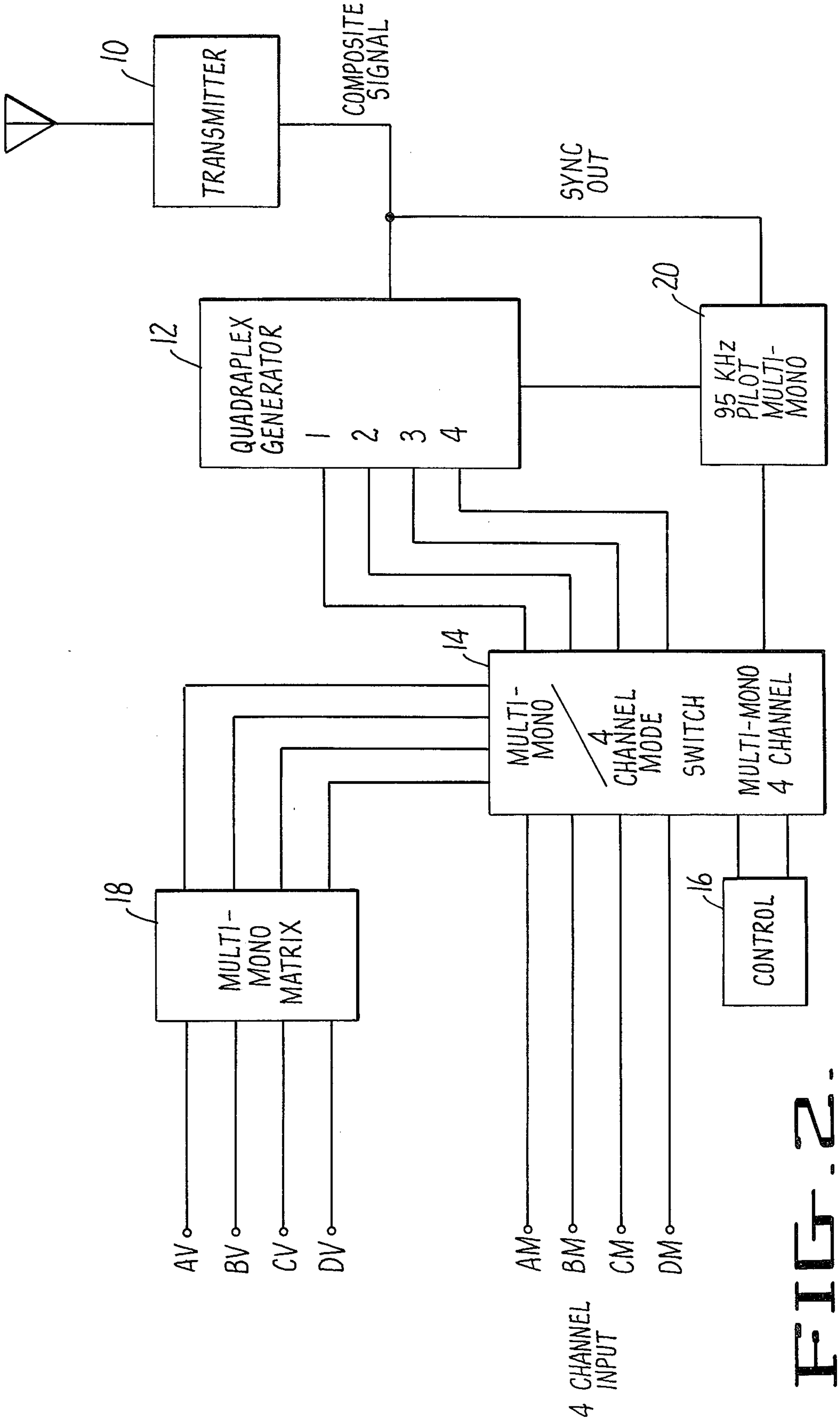
FIG. 2 is a block diagram of a transmitter embodying the present invention.

In FIG. 2 the method of placing these composite signals on the air is shown. The equipment includes an FM transmitter 10 which is fed from a quadraplex generator 12 such as that shown as FIG. 12 of U.S. Pat. No. 3,708,623. The quadraplex generator 12 is connected by means of switch 14 with control 16. Switch 14 is merely a four pole double throw switch wherein one set of four poles is connected to the four outputs of a multi-mono matrix 18 while the other set of four poles is connected to the four music channels designated AM, BM, CM and DM. Control 16 switches between either of the four input channels described and, when switch 14 is switched to the input from the matrix 18, also activates the 95 kHz pilot signal generator 20. At the time when switch 14 is in the four channel mode the four input channels are directly connected to the four input channels of the generator 12, i.e. AM to input 1, BM to input 2, CM to input 3, and DM to input 4. At this time the multi-mono pilot 20 is off so that the four music channels are transmitted in the usual way so that the owner of a mono receiver receives all four channels, the owner of a stereo receiver receives two pairs of signals and the owner of a quadraplex receiver receives four separate signals.

Figure 3:
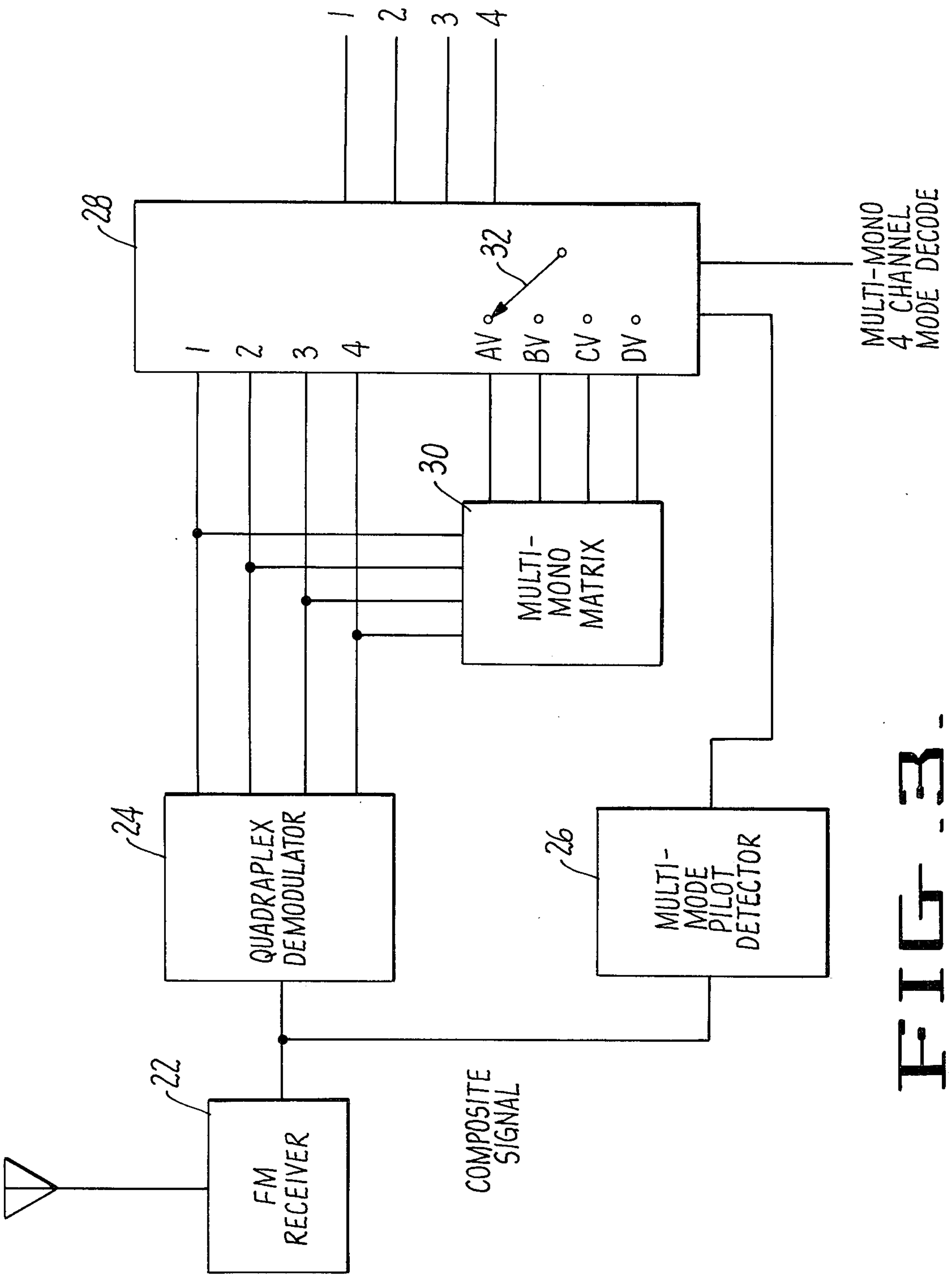
FIG. 3 is a block diagram of a receiver embodying the present invention.
Figure 4:
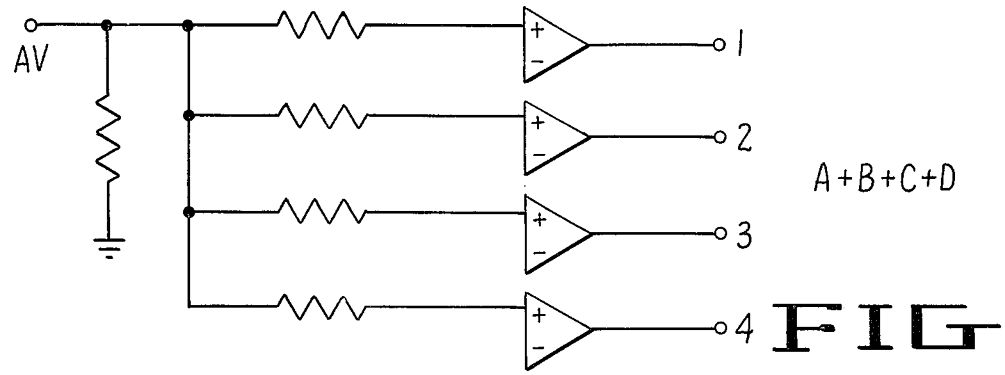
FIGS. 4 through 7 are schematic diagrams showing the method of generating the separated voice signals.

The reception scheme is shown in FIG. 3 wherein the FM receiver 22 has an output to a quadraplex demodulator 24 (see FIG. 13 of U.S. Pat. No. 3,798,623) as well as a detector 26 for the 95 kHz multi-mono pilot. The output of the quadraplex demodulator 24 has four outputs and these are fed both to a mode switch 28 and to a multi-mono matrix 30, later described in detail. Output from the multi-mono matrix 30 is fed to the other four terminals of switch 28. Switch 28 can be thought of as the complement of the switch 14 except that it has a manually selectable output switch 32. Thus, when music is being received, the pilot detector 26 will not detect the 95 kHz pilot, and therefore the output of the quadraplex demodulator 24 will be switched by switch 28 directly to the output terminals 1, 2, 3, 4 so that each of the four channels of music will be produced separately. Now if voice signals are transmitted the 95 kHz pilot will go on and it will show up on the multi-mode pilot detector 26 which will switch 28 over to the multi-mono mode so that the four separate languages will be delivered to the terminals A, B, C and D of switch 28. Now by maneuvering switch 32, one can manually select the language desired. Thus, the output from switch 28 will be selectably switched by a pilot signal from the quadraplex mode to the multi-mono mode while the mechanical switch 32 will enable one to select one of the desired languages.

Figure 5:
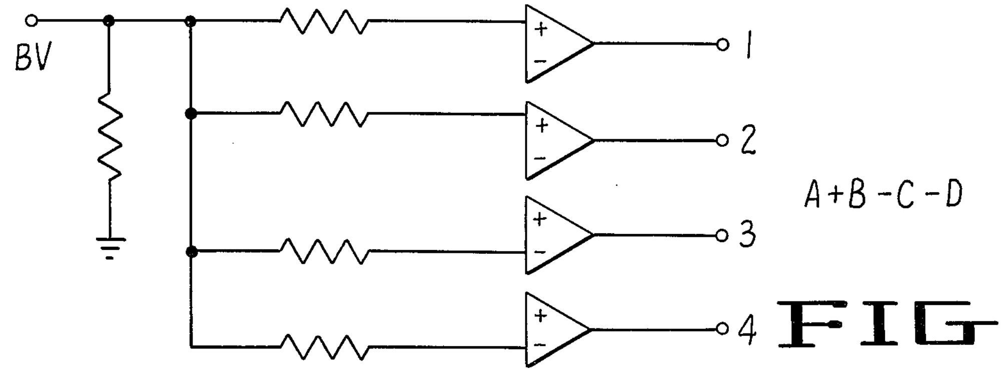
Figure 6:
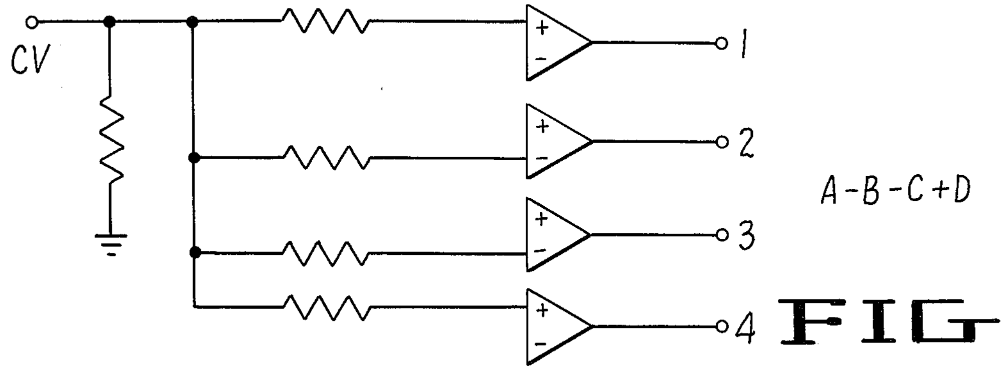
Figure 7:
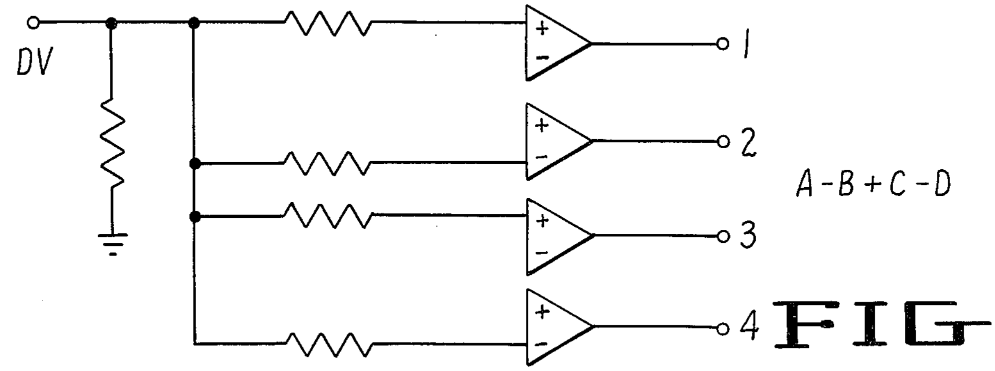
Figure 8:
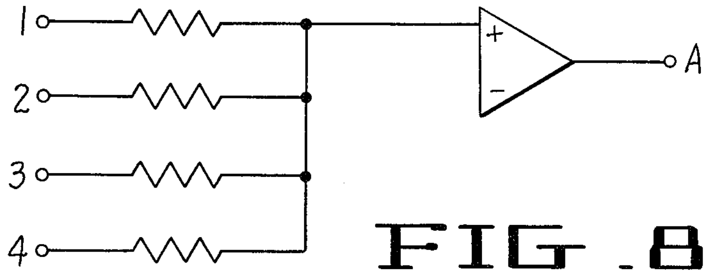
FIGS. 8 through 11 are similar schematic diagrams showing the operation of a receiver during voice reception.

In FIGS. 4 through 7 there is shown a schematic of the transmitting matrix 18 and in FIGS. 8 through 11 is shown the schematic of a receiving matrix 30. In all of these drawings output terminals have been shown as separated for convenience but it will be understood of course, that in FIGS. 4 through 7, all of the terminals numbered 1 will be connected together and so on. Referring now to FIGS. 4 through 7 specifically, it will be seen that the signal AV is applied to the non-inverting inputs of the four operational amplifiers. The outputs are connected respectively to inputs 1, 2, 3 and 4 of the quadraplex generator. This will have the effect of putting signal AV on the base band of the outgoing signal. In FIG. 5, it is shown that signal BV is applied to the non-inverting inputs of the operational amplifiers leading to the inputs 1 and 2 on the quadraplex generator while this signal is applied to the inverting inputs of the operational amplifiers leading to outputs 3 and 4. This places the BV signal on the sine quadrature to the subcarrier centered at 38 kHz. Similarly, as is shown in FIGS. 6 and 7, the CV signal is placed on the cosine quadrant centered at 38 kHz while the DV signal is placed on the subcarrier centered at 76 kHz.

The receiving matrix 30 is the exact complement and is shown in FIGS. 8 through 11. In FIGS. 8 through 11 all of the inputs 1 would be connected together as well as all of the inputs 2 and so on but these connections have not been shown for clarity. The four output signals 1, 2, 3 and 4 are all applied to the non-inverting input of the first operational amplifier and this yields signal A.

Figure 9:
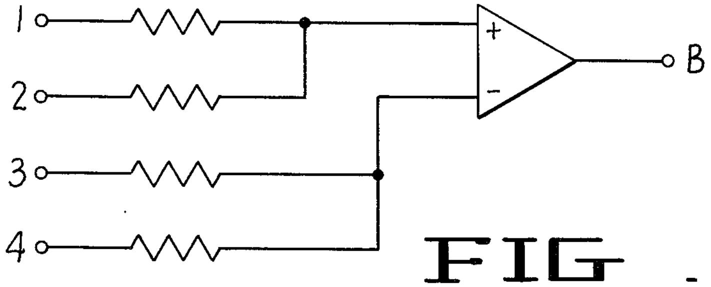
Figure 10:
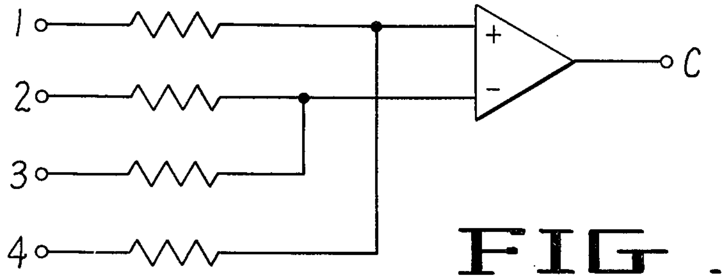

As shown in FIG. 9, the first two inputs from the demodulator are applied to the non-inverting input of the second operational amplifier, while the outputs 3 and 4 are applied to the inverting input of the operational amplifier yielding the signal B. Similarly, as is shown in FIGS. 10 and 11, the separate outputs CV and DV are obtained. Thus, there appear at the output terminals the individual signals AV, BV, CV and DV and one can select the desired language by use of the manual switch 32. Of course, if one does not have a quadraplex demodulator with a multi-mono matrix, one would receive only the signal AV which would ordinarily be the most important language or message.

Another form of multi-mono demodulation for a simple low-cost receiver would utilize a mono receiver and a one subchannel detector or demodulator. This detector would detect the presence of the 95 kHz pilot and use the 19 kHz pilot to synchronize and demodulate the appropriate subcarrier. This would ordinarily be set at the factory wherein a receiver is manufactured to receive as a second channel, only one of the three signals carried on the subcarriers. Thus, a low-cost, two-language receiver with mono-aural capability can be provided which would be completely compatible with the four-language multi-mono transmitter.

A schematic diagram of such a system is shown in FIG. 12. Here, an FM receiver 75 feeds the composite FM signal to line 77 through a low pass filter 79 and a de-emphasis network 81. The output is taken through line 83 one pole of switch 85. When switch 85 is in the "left " position, the audio output through line 87 will be that of an ordinary mono FM receiver, i.e. on voice transmissions, the base band signal representing a single language and on music transmissions the composite of all four channels. The base band signal from the FM receiver is also passed through line 89 to a 19 kHz pilot detector 81, a 95 kHz detector 93 and a subcarrier demodulator 95. Subcarrier demodulator 95 can be set for any of three subchannels, i.e. sine 38 kHz, cosine 38 kHz signals. Naturally, one would purchase a receiver to pick out the desired one of the subcarriers. The demodulated signal goes through line 97 to the other terminal of switch 85 and switch 85 is provided with a driver 99 actuated by the 95 kHz detector. When the 95 kHz signal is detected, driver 99 causes switch 85 to connect line 87 with 97 so that the output through line 87 is that of the selected subcarrier. Thus, during music transmissions, one will receive all four of the channels as on any ordinary FM receiver, while during language transmissions, one will receive the selected subcarrier audio. A switch 101 can be provided to disable the mulit-mono drive switch if one wishes to receive the base band signal at all times.

Although certain specific frequencies have been referred to throughout the specification, it will be understood that this is only for ease in description and in conformity with normal FM standards and that the pilots and subcarriers might be on other frequencies.

It has been assumed that the pilot signal would be on during multi-mono transmissions and off during quadraplex transmissions. Obviously the opposite switching arrangement might be used. Further, it would not be necessary to have the pilot on at all times during one class of transmission but a latching switch might be used and the pilot turned on only in a burst to change the switch from one position to another. Further, a pilot might be modulated and left on at all times with one modulation frequency used to activate the multi-mono matrix and another frequency modulation frequency used for the quadraplex mode.

I claim:

1. In a four channel broadcasting system, means for providing a dual mode of operation, namely, a first mode comprising four interrelated, compatible audio elements designated AM, BM, CM and DM, and a second mode comprising four unrelated, incompatible audio elements designated AV, BV, CV and DV, both modes providing a compatible four channel composite signal for use in conjunction with an FM radio transmitter having either of said modes modulated thereon comprising:

a. a main channel, b. a synchronizing pilot signal of a first predetermined frequency removed from said main channel, c. a first subchannel centered at a first subcarrier frequency at the second harmonic of said pilot signal and a second subchannel centered at a second subcarrier frequency at the fourth harmonic of said pilot signal, d. means for providing a first mode of operation wherein signals AM, BM, CM and DM are present, e. means for modulating a composite of all four of said signals on said main channel, modulating the signal AM + BM − CM − DM on the sine of said first subcarrier frequency and modulating the signal AM − BM − CM + DM in quadrature therewith on the cosine of the first subcarrier and modulating the signal AM − BM + CM − DM on said second subcarrier to provide a signal of the first mode, said means including a quadraplex generator having four inputs, f. means for providing a second mode of operation wherein signals AV, BV, CV and DV are present, g. means for modulating said AV signal on said main channel, modulating said BV signal on said first subcarrier frequency, modulating said CV signal in quadrature with said BV signal on the first subcarrier and modulating said DV signal on said second subcarrier to provide a signal of the second mode, h. means for switching from said first mode to said second mode, said means including a pilot switching signal and i. said means of paragraphs (e) and (g) including a transmitter having first audio input means for the elements AV, BV, CV and DV, said transmitter having:

i. a multi-mono matrix connected to said first audio input means, ii. second audio input means for the signals AM, BM, CM and DM, iii. a multi-mono mode switch having four outputs including a first position wherein said four outputs are connected to said multi-mono matrix, and a second position wherein said four outputs are connected to the second audio input means, iv. said outputs being connected to the four inputs of said quadraplex generator and, v. switching means for switching between said first input and said second input

2. The broadcasting system of claim 1 wherein the main channel occupies the spectrum from about 50 Hz to 15 kHz on the base frequency of the FM transmitter, the synchronizing pilot signal is at 19 kHz, the first subchannel is centered at 38 kHz, the second subchannel is centered at 76 kHz and the pilot switching signal is centered at 95 kHz.

3. The broadcasting system of claim 1 wherein a receiver is provided, said receiver having:

a. quadraplex demodulator means wherein a quadraplex signal is demodulated, b. decoding means for the demodulated signal, c. a multi-mono matrix for the demodulated signal, d. said decoding means having a first input from said quadraplex demodulator and a second input from said multi-mono matrix, e. pilot signal detector means including switching means for switching said decoder from said quadraplex demodulator to said multi-mono matrix, and f. manual selection means for selecting one of said signals when the input to said decoder is in the multi-mono or second mode whereby all four of the signals of the first mode are received in one condition of the multi-mode pilot signal detector and only one of said signals is received in another condition of said multi-mode pilot signal detector.

4. The broadcasting system of claim 1 wherein a receiver is provided, said receiver having:

a. means for demodulating the base band, b. means for demodulating a single subcarrier signal selected from the sine of the first subcarrier, the cosine of the first subcarrier, and the sine of the second subcarrier, and c. means actuated by a pilot switching signal whereby said receiver will receive said demodulated base band signal in one mode and will receive the selected one of said subcarriers when in the second mode.

* * * * *